United States Patent [19]

Liu

[11] 4,233,569
[45] Nov. 11, 1980

[54] HIGH POWER LASER WITH TUNING AND LINE NARROWING CAPABILITY

[75] Inventor: Yung S. Liu, Schenectady, N.Y.

[73] Assignee: General Electric Company, Schenectady, N.Y.

[21] Appl. No.: 668,605

[22] Filed: Mar. 19, 1976

[51] Int. Cl.² ............................................. H01S 3/10
[52] U.S. Cl. ........................ 331/94.5 C; 331/94.5 M; 350/356
[58] Field of Search .................... 331/94.5 C, 94.5 M, 331/94.5 N, 94.5 Q; 350/160 R, 161 W, 356

[56] References Cited

U.S. PATENT DOCUMENTS

| | | | |
|---|---|---|---|
| 3,482,184 | 12/1969 | Schneider et al. | 331/94.5 |
| 3,492,495 | 1/1970 | Demaria et al. | 331/94.5 M |
| 3,670,258 | 6/1972 | Magnante | 331/94.5 |
| 3,934,210 | 1/1976 | Yarborough et al. | 331/94.5 C |
| 3,983,507 | 9/1976 | Tang et al. | 331/94.5 C |

OTHER PUBLICATIONS

CRC *Handbook of Lasers*, Cleveland, Ohio, p. 455, 1977, TK, 7871.3, C2.
Volkonskii et al., Sov. J. Quant. Electron., vol. 5, No. 1, Jul. 1975, pp. 103–104.

*Primary Examiner*—William L. Sikes
*Attorney, Agent, or Firm*—Nathan D. Herkamp; Paul R. Webb, II; James C. Davis, Jr.

[57] ABSTRACT

The cavity of a high power laser is selectively tuned to oscillate in a relatively narrow spectral region by placing inside the cavity a birefringent KD*P filter at the Brewster angle. The degree of phase retardation introduced by the filter is controlled by applying an amplitude-variable voltage across the filter or rotating the filter about its $\beta$ axis. The laser may thus be line-narrowed and tuned, and may be used to generate two coherent signals at different wavelengths without need for an additional resonant cavity.

21 Claims, 6 Drawing Figures

HIGH POWER LASER WITH TUNING AND LINE NARROWING CAPABILITY

INTRODUCTION

This invention relates to lasers, and more particularly to a method and apparatus for achieving line narrowing, tuning, and plural signal generation in a high power Q-switched laser.

It is essential that high power lasers be tunable for many important applications such as laser Raman diagnosis, laser isotope separation, and laser-enhanced chemical reactions. Most present techniques for accomplishing this result employ apparatus such as prisms, gratings, or Fabry-Perot interference etalons, as well as electro-optical devices and/or acousto-optical devices. Such apparatus, however, exhibit one or more of the disadvantages of low damage threshold, high loss, and relatively narrow tuning range, as well as being difficult to operate. Such apparatus is inadequate for tuning a high power laser with low gain such as a neodymium-doped glass laser.

The present invention concerns a simple, rugged, easy to operate tuning method for such laser, using a Brewster birefringent filter to tune the laser over its entire bandwidth of nearly 10 nanometers (100 angstroms). The birefringent filter introduces a phase retardation when placed inside the laser cavity. The degree of retardation depends upon relative angular position of the optical axis of the plate with respect to the cavity polarization direction, as well as the oscillation wavelength. By appropriate choice of material, thickness and orientation of the birefringent filter, the cavity may be tuned selectively, such that oscillation takes place in a relatively narrow spectral region.

It is also desirable to simplify generation of two coherent signals where optical mixing techniques are to be employed to generate a tunable, long wavelength electromagnetic wave in the submillimeter range. Such waves are especially useful in communication systems. The present invention provides a method and apparatus for generating such submillimeter waves from a single laser without need for taking any precautions to maintain frequency and phase synchronism of the two signals.

Accordingly, one object of the invention is to provide simple, rugged tuning apparatus for a high power, Q-switched laser.

Another object is to provide a method and apparatus for selectively tuning the cavity of a high power laser such that oscillation occurs in a relatively narrow spectral region.

Another object is to provide a high power laser in which tuning is accomplished by altering phase retardation introduced by a Brewster birefringent filter inside the laser cavity.

Another object is to provide a simplified submillimeter wavelength generator.

Briefly, in accordance with a preferred embodiment of the invention, a high power, tunable laser comprises an optically-resonant cavity having a reflector at either end thereof, an active medium disposed within the cavity so as to emit optical energy in a direction normal to the reflecting surface of each reflector, and an electro-optical phase-shifting cell disposed within the cavity in the path of the emitted optical energy. A birefringent filter is situated within the cavity at the Brewster angle with respect to the path of optical energy emitted from the active medium. Phase retardation introduced by the birefringent filter is controlled by applying an amplitude-variable voltage across the filter and/or by rotating the plate about its $\beta$ axis.

In accordance with another preferred embodiment of the invention, a method of simultaneously generating two discrete wavelengths from a single laser having a single optically-resonant cavity therein comprises stimulating transitions from the excited state of an active medium within the cavity to a lower energy state. The spectrum of oscillations within the resonant cavity is line-narrowed, and the phase of optical oscillations for two different wavelengths within the cavity is retarded to a value such that two discrete wavelength lines therein are produced.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DESCRIPTION OF TYPICAL EMBODIMENTS

Figure 1:
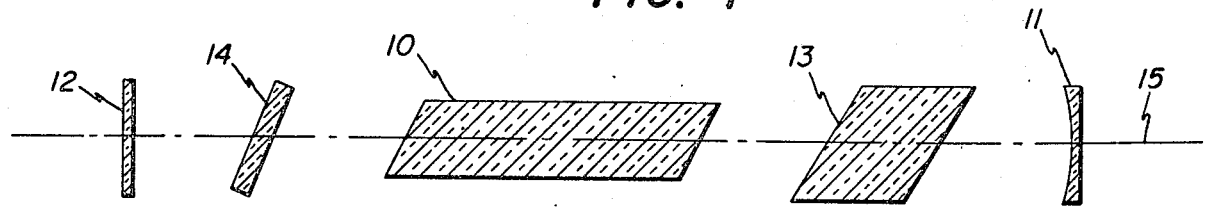
FIG. 1 illustrates, schematically, a high power, tunable laser constructed in accordance with the instant invention.

In FIG. 1, a high power tunable laser constructed in accordance with the instant invention is illustrated schematically. A pair of reflecting means such as mirrors 11 and 12 define opposite ends of a Fabry-Perot type optically-resonant cavity. An emitting structure 10 comprising an active laser medium in which an inversion of energy population states may be established by pumping, or irradiation of the medium with high intensity electromagnetic radiation of appropriate energy, is situated within the cavity. When such population inversion, which is prerequisite to emission of coherent radiation, exists within the active medium of structure 10, a large number of electrons in the active medium are elevated to an excited energy state. Incident photons of the laser emission wavelength may then stimulate transitions from the excited state to a lower energy state. These transitions are cumulative, resulting in emission of coherent radiation.

Emitting structure 10 may conveniently comprise the "zigzag" configuration described in J. P. Chernoch U.S. Pat. No. 3,679,999 issued July 25, 1972 and assigned to the instant assignee, in which the optical path inside structure 10 follows a zigzag path and which, viewed from the side, assumes the configuration of a parallelogram. The longitudinal axis of emitting structure 10 coincides with optical axis 15 of the resonant cavity. The active medium of emitting structure 10 may comprise, for example, 2%–3% neodymium-doped glass, available from Owens-Illinois, Inc., Toledo, Ohio, under the nomenclature ED-2. The pumping wavelength is preferably in the range of 500 to 900 nanometers, and structure 10 emits selectively coherent radiation at approximately 1.06 microns.

A phase-shifting cell 13, of parallelepiped configuration is situated between emitting structure 10 and mirror 11. This cell exhibits the Pockels effect; that is, when no electric field is applied across the cell, optical energy passes through the cell without any modification in direction or polarization. However, when an electric field is impressed across the cell, the polarization plane of a polarized light beam impinging upon the cell is rotated about the direction of the beam. Hence if a voltage is applied across crystal 13 so as to rotate the polarization plane of optical energy impinging thereon from structure 10, light reflected from mirror 11 and impinging upon crystal 13 is polarized in still another plane after passing through crystal 13 on its return from mirror 11. Thus if the voltage across cell 13 is such as to rotate the polarization plane of light passing therethrough by 90°, the beam reflected from mirror 11 suffers increased loss, causing oscillation to terminate. On the other hand, if no voltage is applied across cell 13, the optical energy undergoes essentially no modification when passing therethrough in either direction. Laser oscillation therefore can take place because sufficient power can be stored inside the cavity to allow laser emission to occur. This type of action is known as Q-switching. Crystal 13 may be comprised of potassium dideuterated phosphate (also known as KD*P).

A birefringent filter introduces a phase retardation when inserted in a laser cavity. The degree of phase retardation thus introduced depends upon relative angular position of the optical axis of the filter with respect to direction of the cavity polarization, and also depends upon the oscillation wavelength. In the apparatus of FIG. 1, a birefringent filter 14 is situated in the laser cavity between active medium 10 and output mirror 12, and is placed at the Brewster angle. Filter 14 is cut with its $\beta$ axis normal to its face, and hence the $\beta$ axis is offset from laser cavity axis 15 by an angle $\phi$, as illustrated in FIG. 2.

Figure 2:
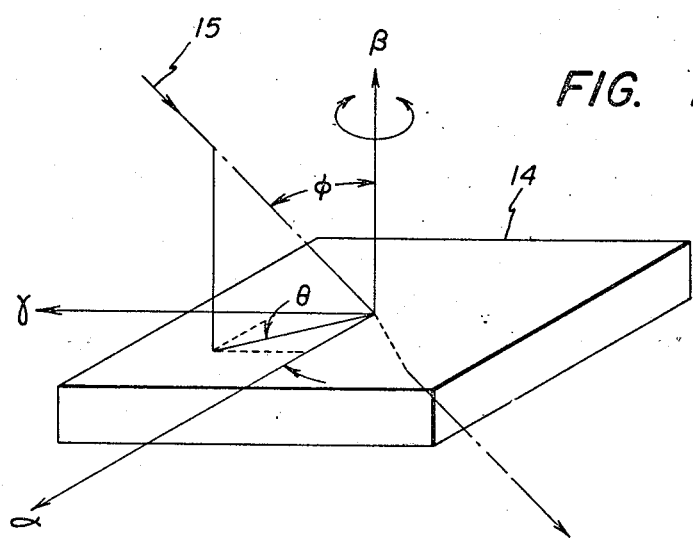
FIG. 2 illustrates the principal axes of the birefringent filter employed in the apparatus of FIG. 1.

In FIG. 2, Brewster birefringent filter 14 is shown with regard to its orientation in the apparatus of FIG. 1. The refractive indices of crystal 14 are illustrated as being along mutually perpendicular $\alpha$, $\beta$ and $\gamma$ directions indicated by the associated arrows. For a uniaxial crystal, which has an ordinary axis and an extraordinary axis, a different index of refraction exists in each of the ordinary and extraordinary directions.

Tuning of the apparatus shown in FIG. 1 is accomplished by rotating filter 14 about the $\beta$ axis. The tuning angle is denoted by $\theta$, as shown in FIG. 2, and may be varied between 0° and 90°. As a specific example, a LiNbO$_3$ plate of b 0.3175 centimeters thickness has been used successfully as filter 14 to tune a glass laser over a bandwidth of about 8 nanometers (80 angstroms) with an output spectral line width of about 1 angstrom by rotating plate 14 through an angle $\delta\theta$ between 1.5° and 5° depending upon the value of $\theta$.

For high power applications, alternative birefringent materials may be employed in filter 14. For example, if filter 14 is comprised of KD*P, laser output line width can be reduced from 10 nanometers to about 0.1–0.2 nanometers. The KD*P birefringent filter showed no damage up to an output of around 0.5 joules, with output mirror 12 of 80% reflectivity, when used in the Q-switched laser configuration illustrated in FIG. 1. Insertion loss is determined by measuring the onset of laser oscillation threshold versus $1/R_1R_2$, where $R_1$ and $R_2$ are the reflectivities of the laser mirrors. Round trip insertion loss using the KD*P birefringent filter was found to be less than 1%.

Figure 3:
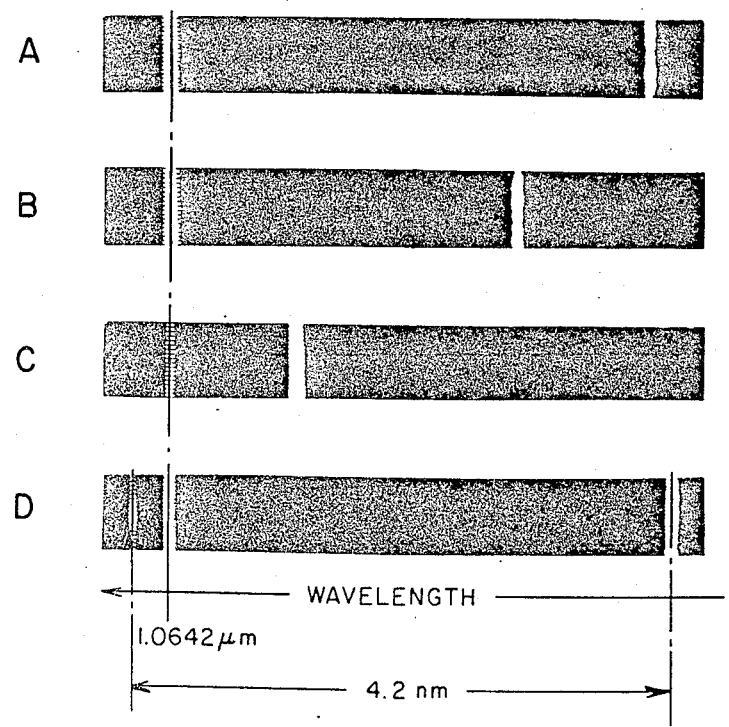
FIG. 3 is a photograph showing output wavebands produced by the apparatus of FIG. 1.

FIG. 3 is a photograph of output spectra illustrating line-narrowing and tuning achieved using a neodymium-doped glass laser with a 0.3175 centimeter thickness lithium niobate Brewster angle birefringent filter as in the embodiment of FIG. 1. Each of the spectra designated A, B, C and D illustrates, for calibration purposes, a wavelength of 1.0642 micrometers produced by a neodymium-doped yttrium-aluminum-garnet laser. The free spectral range of this particular birefringent filter, as evident in spectrum D, is 4.2 nanometers; that is, two narrowed lines are produced by the laser, spaced apart by 4.2 nanometers. In each of spectra A, B and C in FIG. 3, only a single narrowed line is visible, the line at the other end of the free spectral range occurring outside the gain curve of the glass laser oscillator.

Figure 4:
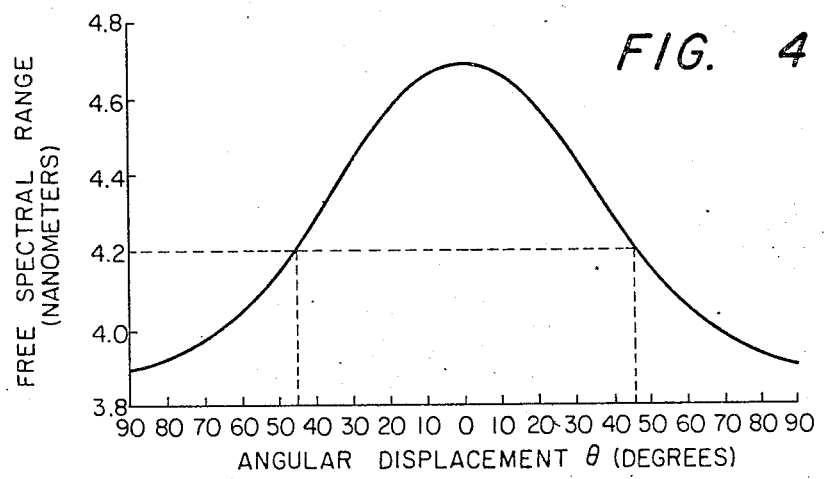
FIG. 4 is a graphical illustration of free spectral range variation with angular position of a specific birefringent filter about its $\beta$ axis in the apparatus shown in FIG. 1.

Under the conditions required for generating spectrum D of FIG. 3, $\theta$ is about 45°, as can be determined from the curve of FIG. 4 which relates to the laser from which the photographs of FIG. 3 were taken. For spectra A, B and C, of FIG. 3, however, $\theta$ is some other value, respectively. The output wavelength variation with $\theta$ is periodic, such that a strong line is produced every 1.5° to 5° change in $\theta$, depending upon the value of $\theta$. At different angles of $\theta$, the free spectral range is also different, being variable from about 3.9 nanometers to about 4.7 nanometers as $\theta$ varies through 180°, as evident from FIG. 4 for a 0.3175 centimeter thickness LiNbO$_3$ birefringent filter.

Figure 5:
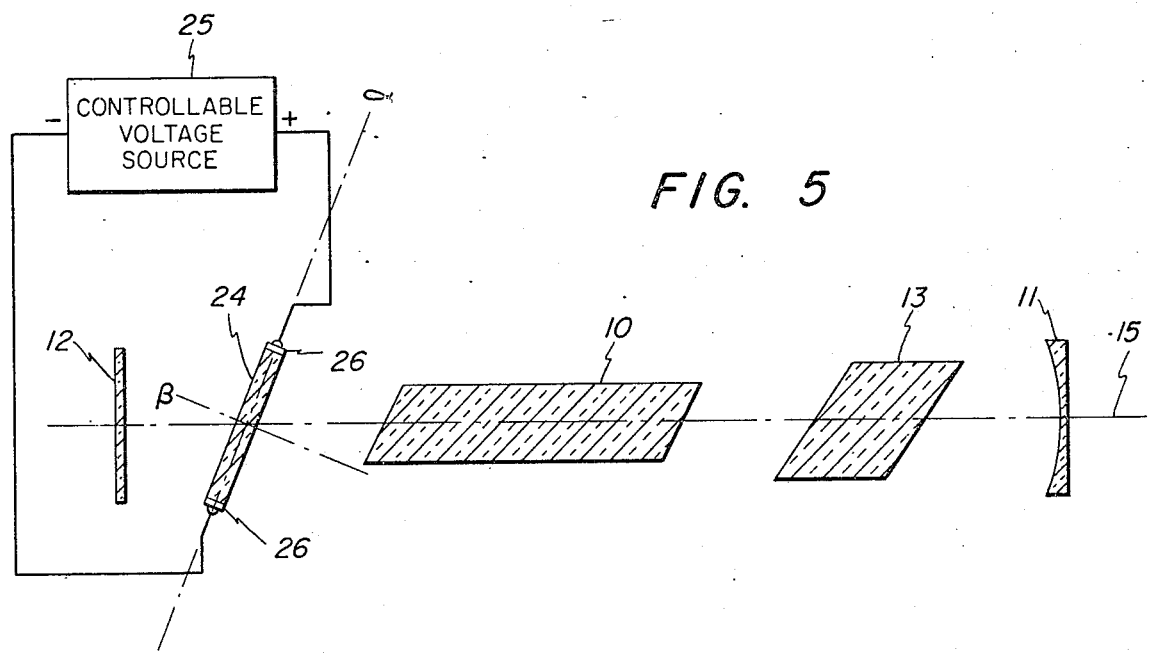
FIG. 5 illustrates application of a voltage across the birefringent filter employed in the apparatus of FIG. 1 for the purpose of controlling phase retardation introduced by the filter.

FIG. 5 illustrates another embodiment of the high power laser of the invention, which is tunable by varying a voltage applied across the birefringent filter. Thus mirrors 11 and 12 define opposite ends of a Fabry-Perot type optically-resonant cavity containing emitting structure 10 comprising an active laser medium such as 2%–3% neodymium-doped glass, the longitudinal axis of which coincides with optical axis 15 of the resonant cavity. Phase-shifting cell 13 situated between emitting structure 10 and mirror 11 provides Q-switching capability as in the embodiment of FIG. 1.

A birefringent filter 24 is situated in the laser cavity between active medium 10 and output mirror 12, and is placed at the Brewster angle with respect to its $\beta$ axis. Rapid tuning of the apparatus shown in FIG. 4 is accomplished by controlling amplitude of a D.C. voltage applied across opposite ends of the filter along the $\alpha$ axis. This voltage is typically in the range of 10 to 20 kilovolts supplied from a controllable voltage source 25 to a pair of electrodes 26 on crystal 24. In this embodiment, crystal 24 is necessarily comprised of material which exhibits the electro-optic effect, such as KD*P or lithium niobate.

Those skilled in the art will appreciate that the tuning range attainable by use of the electro-optic effect is considerably narrower than that attainable by rotating the birefringent filter in the laser cavity. Thus the apparatus of FIG. 5 may include a rotatable filter 24, allowing both coarse and fine tuning adjustments to be made; that is, coarse tuning may be achieved by rotating the filter about its β axis while fine adjustment thereto can be made by appropriate variation in amplitude of output voltage produced by voltage source 25. Alternatively, a plurality of filters may be employed in series in lieu of the single filter 24, at least one of which is utilized to perform coarse tuning and another of which is utilized to perform fine tuning.

Figure 6:
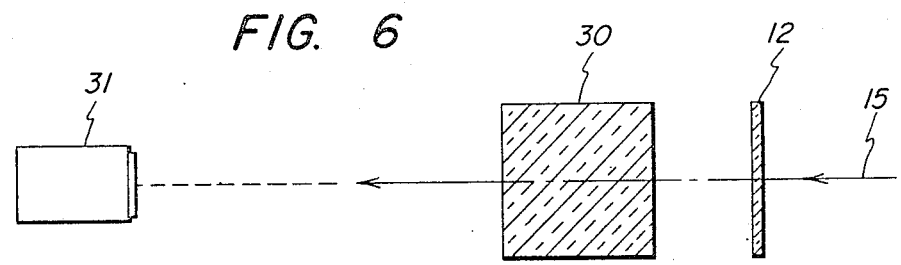
FIG. 6 illustrates, schematically, the laser of FIG. 1 employed in generating electromagnetic waves of submillimeter wavelengths.

FIG. 6 illustrates apparatus that may be employed to generate submillimeter electromagnetic waves, particularly for communication purposes. A nonlinear crystal 30 is situated along optic axis 15 outside emitting mirror 12 of a laser such as that illustrated in FIG. 1 or 5. Crystal 30 may be comprised of LiNbO$_3$, for example. The laser is tuned to operate under output conditions designated D in FIG. 3, such that two discrete wavelengths are produced, and a free spectral range is selected by appropriate choice of θ according to the curve of FIG. 4. These wavelengths are focused upon crystal 30, in which they are optically mixed, or heterodyned, to produce a beat, or difference, frequency which may be detected, for example, by a remotely-located photodetector 31.

While optical mixing has previously been performed using two separate dye lasers (see H. Gerlach, "Difference Frequency Generation in LiIO$_3$ using Two Tunable Dye Lasers", *Optics Communications* 12, 405–408, December, 1974) and using a single dye cell system with a cavity divided into two independent arms (see K. H. Yang et al., "Phase-matched far infrared generation by optical mixing of dye laser beams", *Applied Physics Letters* 23, 669–671, Dec. 15, 1973), the present invention achieves optical mixing of coherent radiation with a drastic reduction in complexity of apparatus. Further, no special precautions need be taken to achieve synchronism, since both waves that are mixed in crystal 30 are generated in common in the same cavity and travel identical paths from the active medium to crystal 30. Consequently, frequency and phase synchronism are inherently and continuously maintained.

In general, therefore, the laser described herein may be employed to generate a single line or a multi-line high power laser oscillation useful for purposes such as resonance spectroscopy and plasma heating, or to generate submillimeter waves by optical mixing, or it may be employed in communications using heterodyne techniques. The invention is also applicable to other broadband lasers, such as dye lasers, for example.

The foregoing describes simple, rugged tuning apparatus for a high power, Q-switched, pulsed laser. A method and apparatus are described for selectively tuning the cavity of the laser such that oscillation occurs in a relatively narrow spectral region. The tuning is accomplished by altering phase retardation introduced by a Brewster birefringent filter inside the laser cavity. The invention may also be employed as a simplified submillimeter wavelength generator.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

I claim:

1. A high power, Q-switched, tunable laser comprising:
    an optically-resonant cavity having reflector means at either end thereof;
    an active medium comprising neodymium-doped glass disposed within said cavity so as to emit optical energy in a direction normal to the reflecting surface of each of said reflector means;
    an electro-optical phase-shifting cell disposed within the cavity in the path of the emitted optical energy; and
    a birefringent filter situated within the cavity and having at least one face substantially at the Brewster angle with respect to the path of optical energy emitted from the active medium, said birefringent filter having refractive indices along mutually perpendicular α, β and γ directions and being cut with its β axis normal to said one face and being rotatable about said β axis.

2. The apparatus of claim 1 wherein said birefringent filter is comprised of a LiNbO$_3$ uniaxial crystal.

3. The apparatus of claim 2 including means coupling a voltage across opposite end faces of said filter.

4. The apparatus of claim 1 wherein said birefringent filter is comprised of a KD*P uniaxial crystal.

5. The apparatus of claim 4 including means coupling a voltage across opposite end faces of said filter.

6. A high power, Q-switched, tunable laser comprising:
    an optically-resonant cavity having reflector means at either end thereof;
    an active medium comprising neodymium-doped glass disposed within said cavity so as to emit optical energy in a direction normal to the reflecting surface of each of said reflector means;
    an electro-optical phase-shifting cell disposed within the cavity in the path of the emitted optical energy;
    a birefringent filter situated within the cavity and having at least one face substantially at the Brewster angle with respect to the path of optical energy emitted from the active medium, said birefringent filter having refractive indices along mutually perpendicular α, β and γ directions and being cut with its β axis normal to its face and being rotatable about said β axis; and
    a non-linear crystal situated in the path of optical energy emitted from said cavity, the angular position of said filter being selected such that two discrete line wavelengths are emitted from said cavity and optically mixed in said nonlinear crystal to produce a beat frequency wavelength.

7. The apparatus of claim 6 wherein said birefringent filter is comprised of LiNbO$_3$ uniaxial crystal.

8. The apparatus of claim 7 including means coupling a voltage across opposite end faces of said filter.

9. The apparatus of claim 6 wherein said birefringent filter is comprised of a KD*P uniaxial crystal.

10. The apparatus of claim 9 including means coupling a voltage across opposite end faces of said filter.

11. A high power, tunable laser comprising:
    an optically-resonant cavity having reflector means at either end thereof;
    an active medium disposed within said cavity so as to emit optical energy in a direction normal to the reflecting surface of each of said reflector means;
    a birefringent electro-optic filter situated within the cavity and having at least one face substantially at the Brewster angle with respect to the path of optical energy emitted from the active medium, said birefringent filter having refractive indices along mutually perpendicular α, β and γ directions and being cut with its β axis normal to said one face; and means coupling a controllable DC voltage across opposite end faces of said filter.

12. The apparatus of claim 11 wherein said birefringent filter is comprised of a LiNbO$_3$ uniaxial crystal.

13. The apparatus of claim 11 wherein said birefringent filter is comprised of a KD*P uniaxial crystal.

14. A high power, tunable laser comprising:
an optically-resonant cavity having reflector means at either end thereof;
an active medium disposed within said cavity so as to emit optical energy in a direction normal to the reflecting surface of each of said reflector means;
a birefringent electro-optic filter situated within the cavity and having at least one face substantially at the Brewster angle with respect to the path of optical energy emitted from the active medium;
means coupling a controllable D.C. voltage across oppisite end faces of said filter; and
a nonlinear crystal situated in the path of optical energy emitted from said cavity, the angular position of said filter being selected such that two discrete line wavelengths are emitted from said cavity and optically mixed in said nonlinear crystal to produce a beat frequency wavelength.

15. The apparatus of claim 14 wherein said birefringent filter is comprised of a LiNbO$_3$ uniaxial crystal.

16. The apparatus of claim 14 wherein said birefringent filter is comprised of a KD*P uniaxial crystal.

17. The method of simultaneously generating two discrete wavelengths from a single laser having a single optically-resonant cavity therein, comprising the steps of:
stimulating transitions from the excited state of an active medium within said cavity to a lower energy state;
line-narrowing the spectrum of oscillations within said resonant cavity; and
retarding the phase of optical oscillations within said cavity to a value such that two discrete wavelength lines therein are produced.

18. The method of claim 17 wherein said two discrete wavelength lines are mixed to produce a single beat frequency output coherent optical wavelength.

19. The method of claim 18 wherein said laser exhibits a variable free spectral range, said method further including the step of varying the degree of phase retardation of said optical oscillations so as to vary said free spectral range and thereby vary said beat frequency output wavelength.

20. The method of claim 19 wherein the step of varying the degree of phase retardation of said optical oscillations comprises rotating a birefringent filter situated within said cavity in the path of optical energy traversing said cavity.

21. The method of claim 19 wherein said step of varying the degree of phase retardation of said optical oscillations comprises varying an electrical voltage across opposite end faces of a birefringent filter situated within said cavity in the path of optical energy traversing said cavity.

* * * * *